(12) United States Patent
Tomioka

(10) Patent No.: US 10,539,903 B2
(45) Date of Patent: Jan. 21, 2020

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Hiroyuki Tomioka, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/314,758

(22) PCT Filed: Aug. 7, 2017

(86) PCT No.: PCT/JP2017/028611
§ 371 (c)(1),
(2) Date: Jan. 2, 2019

(87) PCT Pub. No.: WO2018/037895
PCT Pub. Date: Mar. 1, 2018

(65) Prior Publication Data
US 2019/0155183 A1 May 23, 2019

(30) Foreign Application Priority Data
Aug. 22, 2016 (JP) ................................. 2016-162191

(51) Int. Cl.
*G03G 15/04* (2006.01)
*G02B 26/10* (2006.01)
*G02B 26/12* (2006.01)

(52) U.S. Cl.
CPC ....... *G03G 15/04036* (2013.01); *G02B 26/12* (2013.01)

(58) Field of Classification Search
CPC ......... G03G 15/04036; G03G 21/1666; G03G 2215/04; G03G 2221/1636; G02B 26/10; G02B 26/12
See application file for complete search history.

(56) References Cited

U.S. PATENT DOCUMENTS 6,137,614 A * 10/2000 Endoh .................... G02B 26/12
347/245
2005/0219354 A1 10/2005 Omori et al.
(Continued)

FOREIGN PATENT DOCUMENTS

JP 09-105882 4/1997
JP 2000-292730 10/2000
(Continued)

OTHER PUBLICATIONS

International Search Report dated Oct. 10, 2017 in International (PCT) Application No. PCT/JP2017/028611.

*Primary Examiner* — Sophia S Chen
(74) *Attorney, Agent, or Firm* — Wenderoth, Lind & Ponack, L.L.P.

(57) ABSTRACT

Provided is an optical scanning device, which includes a bottomed box-like casing (31) in which a ceiling side is opened, a rotating polygon mirror (35) housed in the casing (31) to deflect and scan light beams emitted from a light source, a driving motor (41) fixed to a bottom wall of the casing (31) to drive the rotating polygon mirror (35), and a lid member (37) that closes the ceiling side of the casing (31) and is fixed to the casing (31) via a fixing mechanism (311), wherein the fixing mechanism (311) is provided adjacent to a minimum separation part (B) of a sidewall of the casing (31) in which a distance from the rotating polygon mirror (35) is minimum.

3 Claims, 5 Drawing Sheets

(56) References Cited

U.S. PATENT DOCUMENTS

| | | | |
|---|---|---|---|
| 2006/0050346 A1 | 3/2006 | Kim | |
| 2007/0273947 A1* | 11/2007 | Yoshizawa | G02B 26/12 |
| | | | 359/216.1 |
| 2013/0107328 A1 | 5/2013 | Tomioka | |
| 2014/0300682 A1* | 10/2014 | Ozawa | G03G 21/1666 |
| | | | 347/225 |
| 2015/0062679 A1* | 3/2015 | Tomioka | G02B 26/10 |
| | | | 359/204.1 |

FOREIGN PATENT DOCUMENTS

| | | |
|---|---|---|
| JP | 2004-054019 | 2/2004 |
| JP | 2007-164048 | 6/2007 |

* cited by examiner

OPTICAL SCANNING DEVICE AND IMAGE FORMING APPARATUS INCLUDING THE SAME

TECHNICAL FIELD

The present invention relates to an optical scanning device and an image forming apparatus including the same.

BACKGROUND ART

In the related art, as an optical scanning device installed in an electrophotographic image forming apparatus, there has been known an optical scanning device including a rotating polygon mirror that deflects and scans light beams emitted from a light source and a driving motor that drives the rotating polygon mirror (for example, see Patent Literature 1). The rotating polygon mirror is provided in a bottomed box-like casing in which a ceiling side is opened, and the driving motor is fixed to a bottom wall of the casing. The ceiling side of the casing is closed by a lid member. The casing and the lid member are fixed to each other via a fixing mechanism. For an example of the fixing mechanism, there may be a mechanism and the like that cause an engaging claw and an engaging hole to be engaged with each other.

The casing is formed with an inspection hole having an inspection function for performing optical axis adjustment of the light source when the optical scanning device is assembled and a wiring hole having a function for drawing out an electric wiring connected to the driving motor. The inside and outside of the casing communicate with each other via the inspection hole and the wiring hole. The inspection hole is closed by an adhesive tape and the like after completion of assembling the optical scanning device. In a space between the wiring hole and the electric wiring or in a space between the casing and the lid member, a seal member (for example, an elastic member) is provided. In this way, foreign matters (for example, toner, paper powder and the like) outside the casing are prevented from entering into the casing from the space after the casing enters a negative pressure state due to the rotation of the rotating polygon mirror.

CITATION LIST

Patent Literature

Patent Literature 1: Japanese Unexamined Patent Application Publication No. 2007-164048

SUMMARY OF INVENTION

Technical Problem

However, in the optical scanner disclosed in Patent document 1, since it is necessary to provide the seal member to each space and particularly, since it is necessary to provide the seal member to the space between the lid member and the casing across the whole circumference direction of the casing, there is a problem that the cost of the seal member increases and man-hours for assembling increase.

The present invention has been made to solve the aforementioned problems, and an object of the present invention is to efficiently suppress entrance of foreign matters into a casing while minimizing an amount of a seal member to be used.

Solution to Problem

An optical scanning device according to the present invention includes a bottomed box-like casing in which a ceiling side is opened, a rotating polygon mirror housed in the casing to deflect and scan light beams emitted from a light source, a driving motor fixed to a bottom wall of the casing to drive the rotating polygon mirror, and a lid member that closes the ceiling side of the casing and is fixed to the casing via a fixing mechanism.

The fixing mechanism is provided adjacent to a minimum separation part of a sidewall of the casing in which a distance from the rotating polygon mirror is minimum.

An image forming apparatus according to the present invention includes the aforementioned optical scanning device.

Advantageous Effects of Invention

The present invention provides an optical scanning device and an image forming apparatus, by which it is possible to efficiently suppress entrance of foreign matters to a casing while minimizing an amount of a seal member.

DESCRIPTION OF EMBODIMENTS

Hereinafter, embodiments of the present invention will be described in detail on the basis of the drawings. It is noted that the present invention is not limited to the following embodiments.

Figure 1:
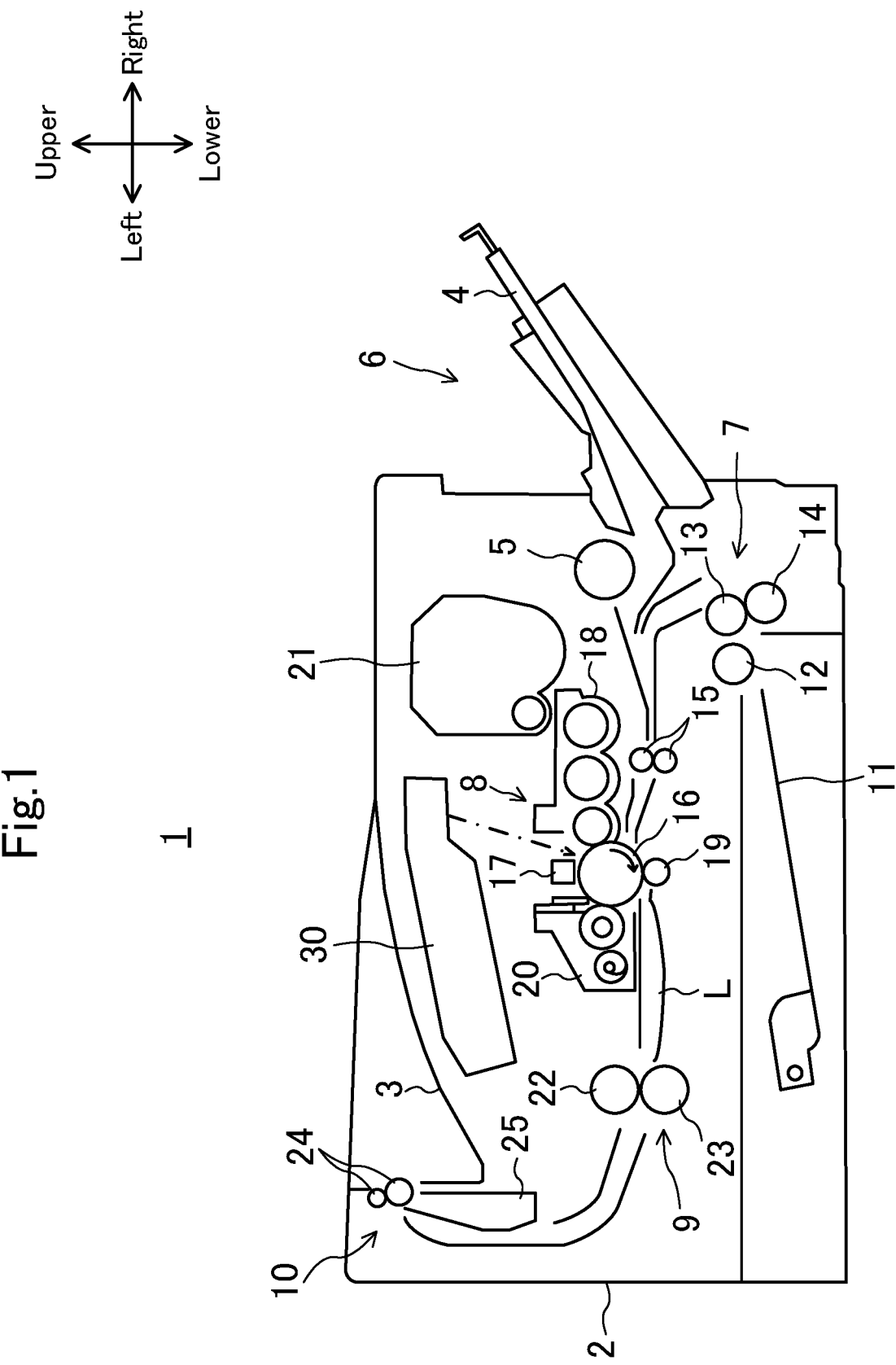
FIG. 1 is an overall view illustrating a schematic configuration of an image forming apparatus provided with an optical scanning device in an embodiment.

FIG. 1 is a sectional view illustrating a schematic configuration of a laser printer 1 as an image forming apparatus in the present embodiment. In the following description, a front side and a rear side indicate a front side and a rear side of the laser printer 1 (a front side and a back side in a direction vertical to the paper surface of FIG. 1) and a left side and a right side indicate a left side and a right side when the laser printer 1 is viewed from the front side.

As illustrated in FIG. 1, the laser printer 1 includes a box-like printer body 2, a manual sheet feeding unit 6, a cassette sheet feeding unit 7, an image forming unit 8, a fixing unit 9, and a sheet discharge unit 10. Accordingly, the laser printer 1 is configured to form an image on a sheet on the basis of image data transmitted from a terminal and the like (not illustrated) while conveying the sheet along a conveyance path L in the printer body 2.

The manual sheet feeding unit 6 has a manual tray 4 provided at one side of the printer body 2 so as to be openable and closable, and a manual sheet feeding roller 5 rotatably provided inside the printer body 2.

The cassette sheet feeding unit 7 is provided at a bottom part of the printer body 2. The cassette sheet feeding unit 7 includes a sheet feeding cassette 11 that stores a plurality of stacked sheets, a picking roller 12 that takes out the sheets in the sheet feeding cassette 11 one by one, and a feed roller 13 and a retard roller 14 that separate the taken-out sheets one by one and send the separated sheet to the conveyance path L.

The image forming unit 8 is provided above the cassette sheet feeding unit 7 in the printer body 2. The image forming unit 8 includes a photosensitive drum 16 (an image carrying member) rotatably provided in the printer body 2, a charging device 17, a developing unit 18, a transfer roller 19, a cleaning unit 20, which are disposed around the photosensitive drum 16, and an optical scanning device 30 and a toner hopper 21 disposed above the photosensitive drum 16. Accordingly, the image forming unit 8 is configured to form an image on a sheet supplied from the manual sheet feeding unit 6 or the cassette sheet feeding unit 7.

The conveyance path L is provided with a pair of resist rollers 15 that allow sent sheets to be temporarily waiting and then supply the sheets to the image forming unit 8 at a predetermined timing.

The fixing unit 9 is disposed at a lateral side of the image forming unit 8. The fixing unit 9 includes a fixing roller 22 and a pressure roller 23 brought into press-contact with each other and rotating together with each other. Accordingly, the fixing unit 9 is configured to fix a toner image, which has been transferred to a sheet in the image forming unit 8, to the sheet.

The sheet discharge unit 10 is provided above the fixing unit 9. The sheet discharge unit 10 includes a sheet discharge tray 3, a sheet discharge roller pair 24 for conveying a sheet to the sheet discharge tray 3, and a plurality of conveyance guide ribs 25 for guiding the sheet to the sheet discharge roller pair 24. The sheet discharge tray 3 is formed in a concave shape at an upper part of the printer body 2.

When the laser printer 1 receives image data, the photosensitive drum 16 is rotationally driven and the charging device 17 charges the surface of the photosensitive drum 16 in the image forming unit 8.

Then, on the basis of the image data, light beams are emitted to the photosensitive drum 16 from the optical scanning device 30. The laser beams are irradiated onto the surface of the photosensitive drum 16, so that an electrostatic latent image is formed. The electrostatic latent image formed on the photosensitive drum 16 is developed in the developing unit 18, so that the electrostatic latent image becomes a visible image as a toner image.

Thereafter, the sheet is pressed to the surface of the photosensitive drum 16 by the transfer roller 19. By so doing, the toner image of the photosensitive drum 16 is transferred to the sheet. The sheet with the transferred toner image is heated and pressed by the fixing roller 22 and the pressure roller 23 in the fixing unit 9. As a consequence, the toner image is fixed to the sheet.

<Optical Scanning Device>

Figure 2:
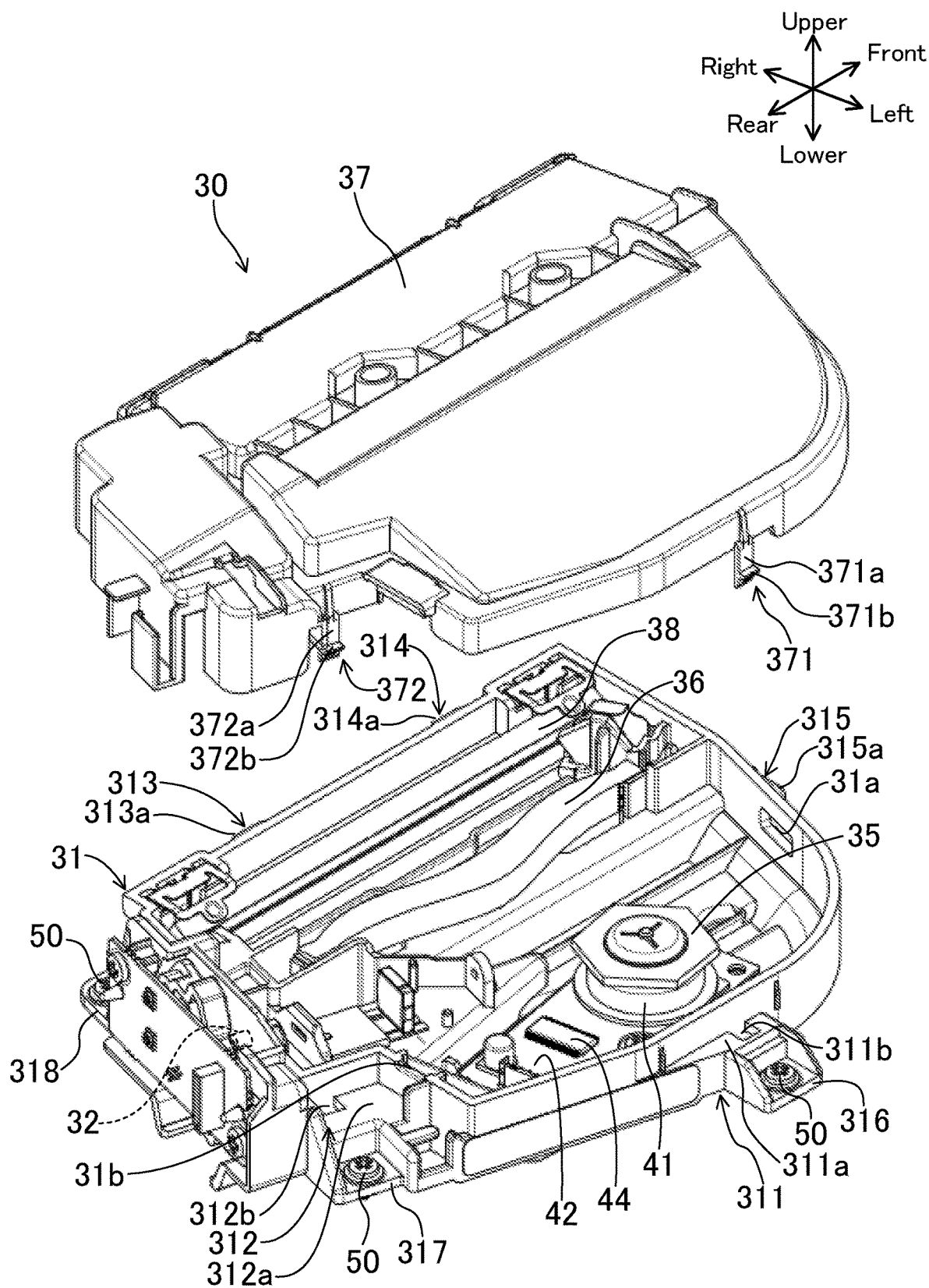
FIG. 2 is an exploded perspective view when an optical scanning device is viewed from first and second fixing part sides.
Figure 3:
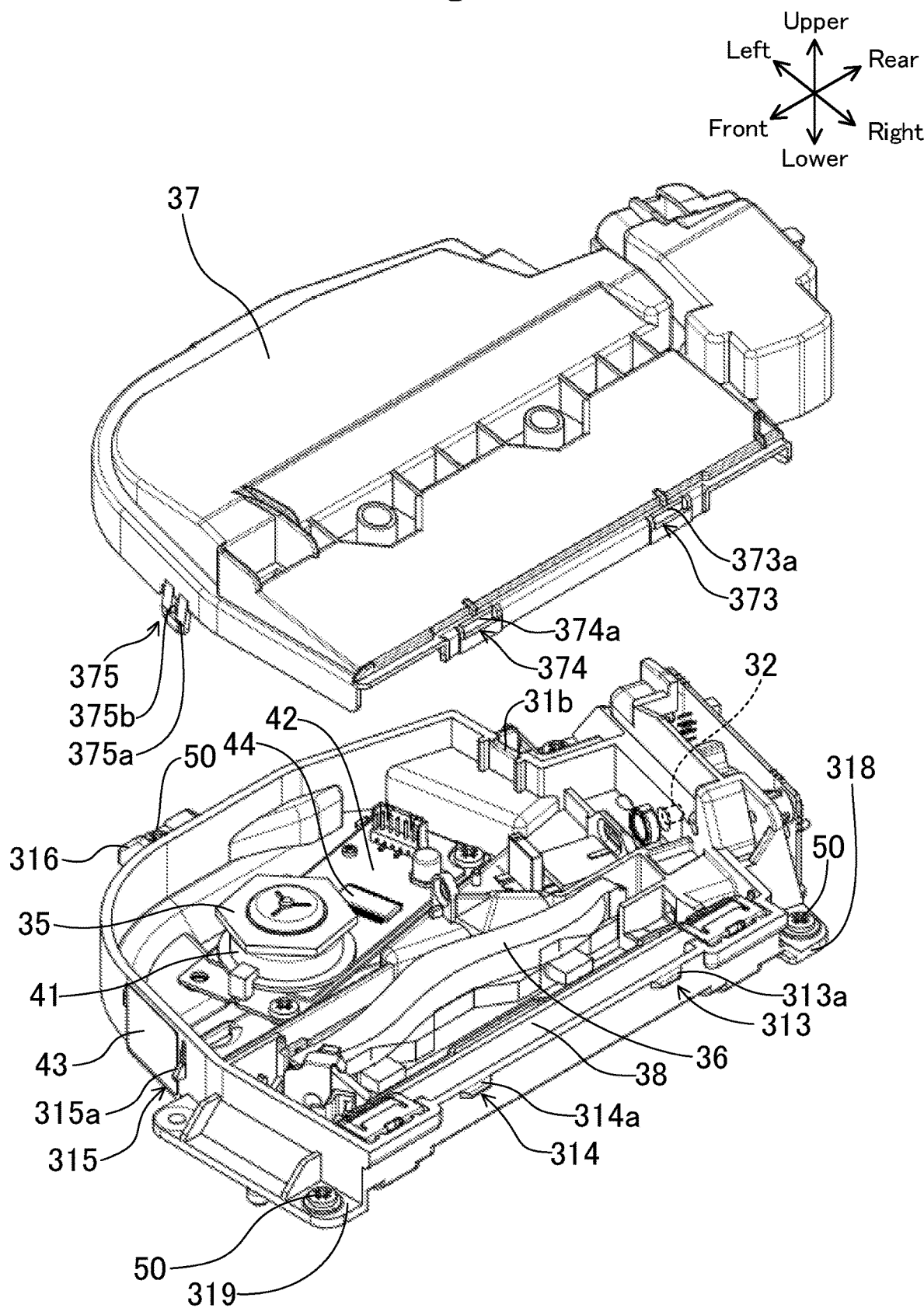
FIG. 3 is an exploded perspective view when an optical scanning device is viewed from third and fourth fixing part sides.

FIG. 2 and FIG. 3 are exploded perspective views illustrating the optical scanning device 30 in the present embodiment. As illustrated in FIG. 2 and FIG. 3, the optical scanning device 30 includes a casing 31, a polygon mirror 35 provided in the casing 31 to reflect light from a light source 32, an image forming lens 36 provided on an optical path of the light reflected by the polygon mirror 35 in the casing 31, and a lid member 37 mounted at the casing 31.

The casing 31 is configured by a bottomed box-like member in which a ceiling side is opened. An opened part of the ceiling side in the casing 31 is covered by the lid member 37. The casing 31 and the lid member 37 are all configured by a resin material.

The polygon mirror 35 is provided at a bottom part of the casing 31 via a polygon motor (a driving motor) 41. The polygon mirror 35 is a rotating polygon mirror and is rotationally driven by the polygon motor 41. The polygon motor 41 is fixed to a bottom wall of the casing 31 via a board 42 mounted with a control integrated circuit (IC) 44.

At a part of a sidewall of the casing 31, which is positioned at a rear side of the polygon motor 41, a rectangular notched part (a communicating part) 31b opened upward is formed. A rectangular communicating part for communicating the inside and outside of the casing 31 is formed by the notched part 31b and a lower surface of the lid member 37. An electric harness connected to the polygon motor 41 is drawn out to the outside of the casing 31 through the communicating part.

At a part of the sidewall of the casing 31, which is positioned at a front side of the polygon motor 41, a rectangular inspection hole (a communicating part) 31a is formed. The inspection hole 31a makes the inside and outside of the casing 31 communicate with each other by passing through the sidewall in a thickness direction. The inspection hole 31a is used in order to align an optical axis of the light source 32 when the optical scanning device 30 is assembled. The inspection hole 31a is closed by an adhesive tape 43 (illustrated only in FIG. 3) from the outside of the casing 31 after completion of assembling the optical scanning device 30.

The light source 32 is disposed around the sidewall of the casing 31. The light source 32, for example, is a laser light source having a laser diode. Furthermore, the light source 32 is configured to emit laser beams toward the polygon mirror (the rotating polygon mirror). Between the light source 32 and the polygon mirror 35, optical elements such as a collimator lens and a cylindrical lens are disposed.

As illustrated in and FIG. 2 and FIG. 3, the image forming lens 36 is installed at the bottom part of the casing 31 on a lateral side of the polygon mirror 35. Furthermore, the image forming lens 36 extends in a long shape along the bottom wall of the casing 31.

Furthermore, inside the casing 31, a folding mirror 38 is disposed at an opposite side of the polygon mirror 35 with respect to the image forming lens 36. The folding mirror 38 extends in a long shape along the image forming lens 36.

In the casing 31, an opening (not illustrated) is formed in an area opposite to the folding mirror 38. Furthermore, reflected light of the folding mirror 38 is emitted out of the casing 31 via the opening.

By so doing, laser beams emitted from the light source 32, for example, are converted into parallel light beams by the collimator lens, and then are collected on a reflecting surface of the polygon mirror 35 by the cylindrical lens. The light collected on the polygon mirror 35 is reflected by the reflecting surface of the polygon mirror 35 and is incident on the image forming lens 36 as scanning light. The scanning light having passed through the image forming lens 36 is reflected by the folding mirror 38 toward the photosensitive drum 16 outside the casing 31 via an opening (not illustrated). By so doing, an image of the scanning light is formed on the surface of the photosensitive drum 16.

The scanning light having the image formed on the surface of the photosensitive drum 16 scans the surface of the photosensitive drum 16 in a main scanning direction due to the rotation of the polygon mirror 35 while scanning the surface of the photosensitive drum 16 in a sub-scanning direction due to the rotation of the photosensitive drum 16, so that an electrostatic latent image is formed on the surface of the photosensitive drum 16.

Figure 4:
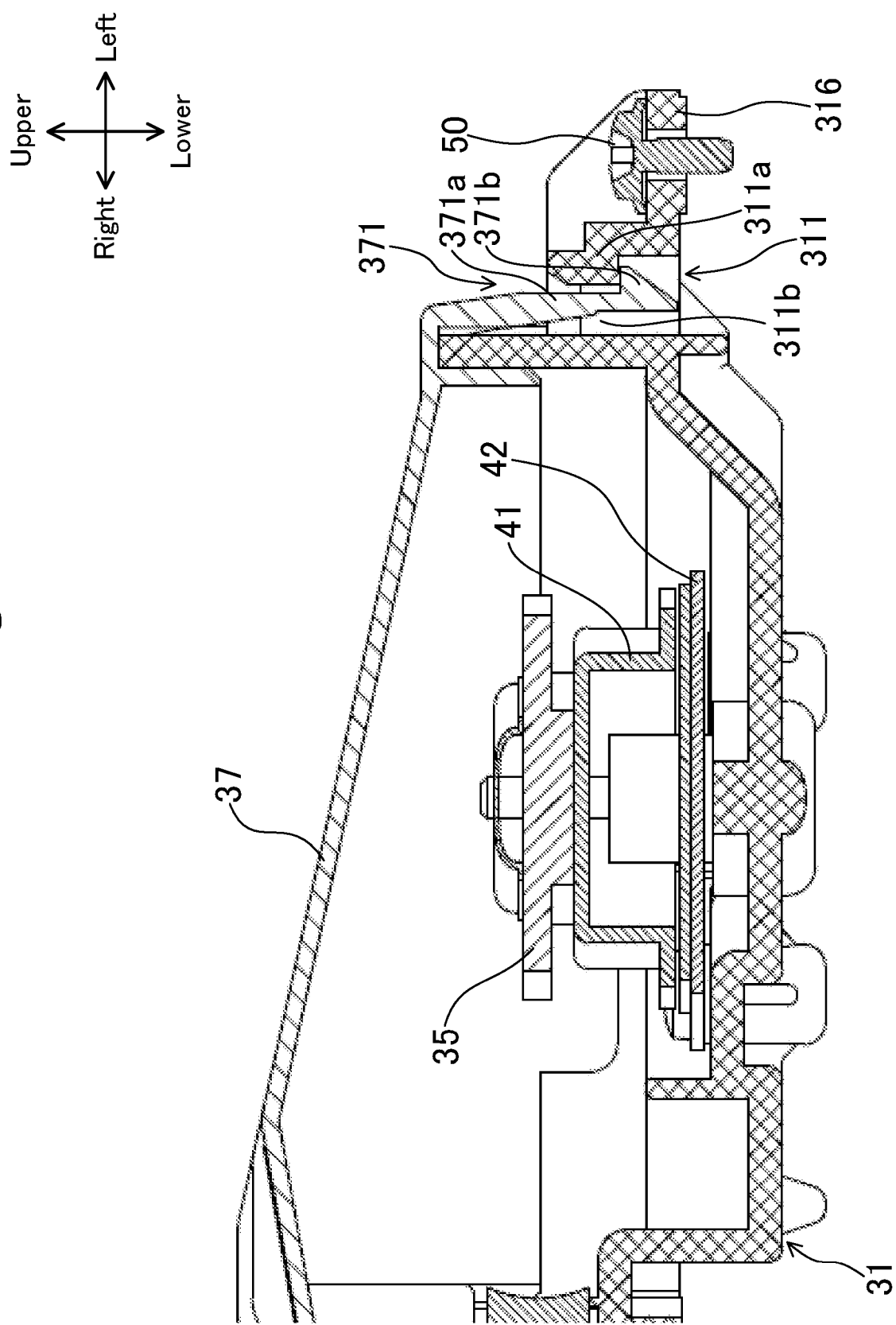
FIG. 4 is a sectional view when an optical scanning device is cut along a plane which is parallel to a rotating shaft of a polygon mirror and passes a first fixing part.

Next, with reference to FIG. 2 to FIG. 4, a fixing structure of the casing 31 and the lid member 37 will be described. At an outer side of the sidewall of the casing 31, first to fifth fixing parts 311 to 315 are provided in order to fix the casing 31 to the lid member 37. The first fixing part 311 and the second fixing part 312 are disposed at the left end part of the casing 31 while being spaced apart from each other in the front and rear direction. The first fixing part 311 and the second fixing part 312 are configured with protruding ribs 311a and 312a protruding from the outside surface of the sidewall of the casing 31, and engaging holes 311b and 312b passing through in the thickness direction of the protruding ribs 311a and 312a, respectively. The third fixing part 313 and the fourth fixing part 314 are disposed at the right end part of the casing 31 while being spaced apart from each other in the front and rear direction. The third fixing part 313 and the fourth fixing part 314 (see FIG. 3) include engaging claws 313a and 314a protruding from a right sidewall of the casing 31. The fifth fixing part 315 is disposed at the center of the front end part of the casing 31 in the right and left direction. The fifth fixing part 315 includes an engaging claw 315a protruding from a front sidewall of the casing 31.

At positions of a peripheral edge part of the lid member 37, which correspond to the first to fifth fixing parts 311 to 315, first to fifth fixed parts 371 to 375 are respectively provided. The first and second fixed parts 371 and 372 include rectangular plate parts 371a and 372a hung down from a left sidewall of the lid member 37, and engaging claws 371b and 372b protruding from lower end parts of the rectangular plate parts 371a and 372a, respectively. The third and fourth fixed parts 373 and 374 (see FIG. 3) include engaging holes 373a and 374a formed at a right sidewall of the lid member 37, respectively. The fifth fixed part 375 includes a rectangular plate part 375a hung down from a front sidewall of the lid member 37, and an engaging hole 375b formed in the rectangular plate part 375a.

In a state in which the lid member 37 has been fixed to the casing 31, the engaging claws 371b and 372b of the lid member 37 are engaged with the engaging holes 311b and 312b of the casing 31, the engaging holes 373a and 374a of the lid member 37 are engaged with the engaging claws 313a and 314a of the casing 31, and the engaging hole 375b of the lid member 37 is engaged with the engaging claw 315a of the casing 31. The first fixing part 311 and the first fixed part 371 correspond to a fixing mechanism.

Next, with reference to FIG. 2 to FIG. 5, a fixing structure of the casing 31 with respect to the printer body 2 will be described. The casing 31 is fixed to a fixed member in the printer body 2 by four bolts 50. The casing 31 is formed at the peripheral edge part thereof with first to fourth plate-like seat parts 316 to 319 through which the bolts 50 pass. An upper surface of each of the plate-like seat parts 316 to 319 has a flat shape and serves as a seat surface of the bolt head. The first plate-like seat part 316 is disposed at the center of the left end part of the casing 31 in the front and rear direction, the second plate-like seat part 317 is disposed at the corner of the rear and left side of the casing 31, the third plate-like seat part 318 is disposed at the corner of the rear and right side of the casing 31, and the fourth plate-like seat part 319 is disposed at the corner of the front and right side of the casing 31. The first plate-like seat part 316 is disposed adjacent to a radial outside of the casing 31 with respect to the first fixing part 311. The first plate-like seat part 316 and the bolts 50 correspond to a casing fixing mechanism.

Next, with reference to FIG. 5, the shape of the sidewall of the casing 31 around the polygon mirror 35 will be described in detail. The peripheral part of the polygon mirror 35 at the sidewall of the casing 31 has a flat plate part 31c, a curved wall part 31d, and an inclined wall part 31e. The flat plate part 31c is provided at a left side of the polygon mirror 35 and has a linear shape extending in the front and rear direction in a plan view. The curved wall part 31d is curved rightward from a front end part of the flat plate part 31c in the plan view. The curved wall part 31d has an arc shape convex to the outer side of the casing 31 in the plan view. The inclined wall part 31e is inclined frontward toward a right side from a right end part of the curved wall part 31d in the plan view.

A center part of the flat plate part 31c in the front and rear direction is a minimum separation part B of the sidewall of the casing 31 in which a distance from the polygon mirror 35 is minimum, that is, a distance from a circumscribed circle A of the polygon mirror 35 is minimum when viewed from an axial direction of the polygon mirror 35, and the first fixing part 311 and the first plate-like seat part 316 are disposed adjacent to the outer side of the casing of the minimum separation part B. The curved wall part 31d is curved such that distances d1, d2 . . . dn from the polygon mirror 35 (the circumscribed circle A) gradually increase from an upstream side to a downstream side in a rotation direction (a direction of an arrow R of the drawing) of the polygon mirror 35. The inclined wall part 31e extends from the right end part of the curved wall part 31d in a tangential direction thereof in the plan view. The inclined wall part 31e is formed with the inspection hole 31a in the vicinity of a boundary with the curved wall part 31d.

Figure 5:
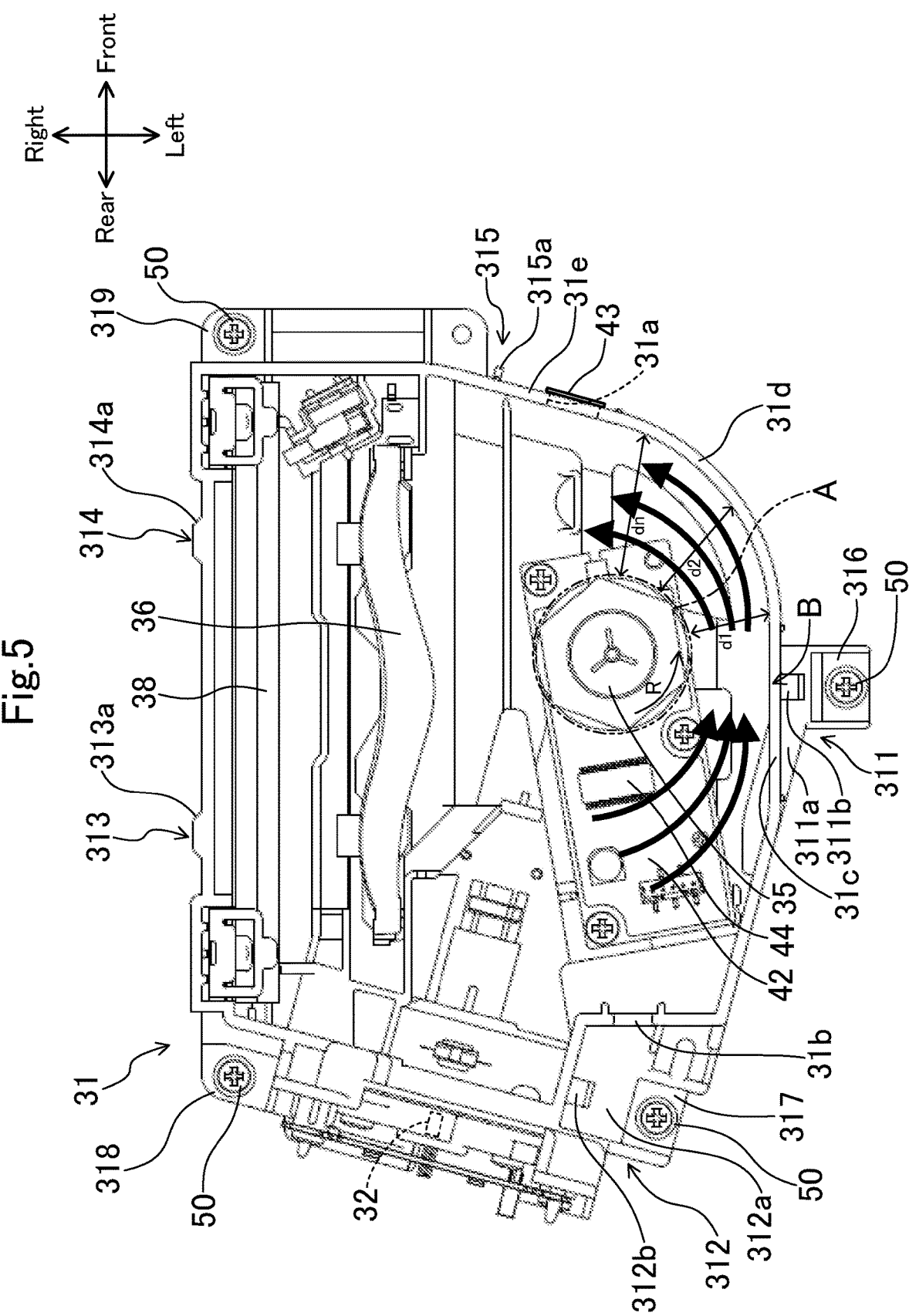
FIG. 5 is a plan view illustrating a state in which a lid member has been removed from an optical scanning device.

In the optical scanning device 30 configured as above, when the polygon mirror 35 is rotationally driven, airflow is induced around the polygon mirror 35 from the upstream side to the downstream side in the rotation direction of the polygon mirror 35 as illustrated in the thick arrows of FIG. 5. The speed of the airflow increases toward the polygon mirror 35 side from the upstream side of the polygon mirror 35, is maximum when the airflow passes through between the polygon mirror 35 and the minimum separation part B of the sidewall of the casing, and then decreases toward the downstream side of the polygon mirror 35. In the casing inside of the minimum separation part B at the sidewall of the casing 31, since the airflow speed is maximum, strong negative pressure is generated. Therefore, since air out of the casing 31 is introduced into the casing 31 from a space between the casing 31 and the lid member 37 in the minimum separation part B, foreign matters included in the air may be attached to the reflecting surface of the polygon mirror 35 or the image forming lens 36.

In contrast, in the present embodiment, the first fixing part 311 of the first to fifth fixing parts 311 to 315 for fixing the casing 31 to the lid member 37 is disposed adjacent to the outside of the minimum separation part B of the sidewall of the casing 31. In this way, coupling force between the casing 31 and the lid member 37 is sufficiently ensured at a part of the casing 31 in which the largest negative pressure is generated, so that air out of the casing 31 can be prevented from being introduced to the part together with foreign matters. Furthermore, it is possible to suppress the intrusion of air to the casing 31 without providing a seal member between the casing 31 and the lid member 37, so that it is possible to reduce material cost required for the seal member. Furthermore, since it is not necessary to assemble the seal member when the optical scanning device 30 is assembled, it is possible to reduce work man-hours.

Furthermore, in the present embodiment, the sidewall of the casing 31 has the curved wall part 31d in which the distance from the polygon mirror 35 gradually increases from the minimum separation part B toward the downstream side in the rotation direction of the polygon mirror 35 and the inclined wall part 31e, which is connected to a downstream side end part in the curved wall part 31d and extends in the tangential direction of the curved wall part 31d, in the plan view (when viewed from the opened side of the casing 31), wherein the inclined wall part 31e is formed with the inspection hole 31a having an inspection function (a predetermined function) for inspecting an optical axis position of the light source 32 in the assembling process of the optical scanning device 30.

The inspection hole 31a is closed by the adhesive tape 43 after completion of assembling the optical scanning device 30; however, when negative pressure around the inspection hole 31a is strong, air out of the casing 31 may be introduced from a space between the inspection hole 31a and the adhesive tape 43 together with foreign matters. In contrast, in the present embodiment, the speed of airflow, which has passed through between the polygon mirror 35 and the minimum separation part B of the sidewall of the casing 31, is reduced by a diffuser effect according to a gradual increase in a distance between the polygon mirror 35 and the curved wall part 31d in a process of passing through between the polygon mirror 35 and the curved wall part 31d. Consequently, when the airflow passes through the inclined wall part 31e, the speed of the airflow is sufficiently reduced. Consequently, strong negative pressure is prevented from being generated in the vicinity of the inspection hole 31a, so that it is possible to suppress the intrusion of air out of the casing 31 from the inspection hole 31a. Furthermore, since the inspection hole 31a is formed at the downstream side from the minimum separation part B of the sidewall of the casing 31, air out of the casing 31 is not drawn into the casing 31 from the inspection hole 31a as with a case where the inspection hole 31a is provided at the upstream side of the minimum separation part B for example. That is, in the present embodiment, the inspection hole 31a is provided at the downstream side of the minimum separation part B, resulting in an effect that air blows from the inspection hole 31a. Consequently, it is possible to reliably suppress the intrusion of air out of the casing 31 to the casing 31 through the inspection hole 31a.

Furthermore, in the present embodiment, the first plate-like seat part 316 of the first to fourth plate-like seat parts 316 to 319, into which bolts for fixing the casing 31 to the printer body 2 are inserted, is disposed adjacent to the minimum separation part B of the sidewall of the casing 31 similarly to the first fixing part 311. According to this, it is possible to firmly fix a part of the sidewall of the casing 31, through which the rotational vibration of the polygon mirror 35 is most easily transmitted, to the printer body 2. Consequently, the entire casing 31 is prevented from vibrating due to the rotation of the polygon mirror 35, so that it is possible to prevent the reduction of the optical performance of the optical scanning device 30.

Other Embodiments

In the aforementioned embodiment, separately from the fixing mechanism (the first to fifth fixing parts 311 to 315 and the first to fifth fixed parts 371 to 375) for fixing the lid member 37 to the casing 31, the fixing mechanism (the first to fourth plate-like seat parts 316 to 319 and the bolts 50) for fixing the casing 31 to the printer body 2 is provided; however, the present invention is not limited thereto and both fixing mechanisms may also be commonly used. In such a case, for example, it is sufficient if the lid member 37 and the casing 31 are jointly fastened and fixed to the printer body 2 by the bolts 50.

In the aforementioned embodiment, the notched part (the communicating part) 31b for drawing an electric harness out of the casing 31 is formed at a part of the sidewall of the casing 31, which is positioned at the rear side of the polygon motor 41; however, the present invention is not limited thereto and the notched part 31b may be formed at the inclined wall part 31e similarly to the inspection hole 31a. Specifically, for example, it is sufficient if the notched part 31b is formed at an upper end of a part, at which the inspection hole 31a has been formed, in the sidewall of the casing 31.

In the aforementioned embodiment, the laser printer 1 has been described as an example of an image forming apparatus; however, an image forming apparatus according to the present invention is not limited thereto and for example, may be other image forming apparatuses such as a copy machine, a scanner device, and a multifunctional peripheral.

INDUSTRIAL APPLICABILITY

As described above, the present invention is available for an optical scanning device and an image forming apparatus including the same.

The invention claimed is:
1. An optical scanning device comprising:
a bottomed box-shaped casing in which a ceiling side is opened;
a rotating polygon mirror housed in the bottomed box-shaped casing to deflect and scan light beams emitted from a light source;
a driving motor fixed to a bottom wall of the bottomed box-shaped casing to drive the rotating polygon mirror; and
a lid member that closes the ceiling side of the bottomed box-shaped casing and is fixed to the bottomed box-shaped casing via a fixing mechanism, wherein
the fixing mechanism is provided adjacent to a minimum separation part of a sidewall of the bottomed box-shaped casing at which a distance from the rotating polygon mirror is a minimum,
the sidewall of the bottomed box-shaped casing has a curved wall part in which the distance from the rotating polygon mirror gradually increases from the minimum separation part toward a downstream side in a rotation direction of the rotating polygon mirror, and an inclined wall part, which is connected to a downstream side end part of the curved wall part and extends in a tangential direction of the curved wall part when viewed from an opened side of the bottomed box-shaped casing, and
the inclined wall part is formed with a communicating part having a predetermined function and making an inside and an outside of the bottomed box-shaped casing communicate with each other.

2. The optical scanning device of claim 1, further comprising:
a casing fixing mechanism for fixing the bottomed box-shaped casing to a fixed member,
wherein the bottomed box-shaped casing fixing mechanism is provided adjacent to the minimum separation part of the sidewall of the bottomed box-shaped casing.

3. An image forming apparatus comprising the optical scanning device of claim 1.

\* \* \* \* \*